US008719634B2

(12) United States Patent
Cowie et al.

(10) Patent No.: US 8,719,634 B2
(45) Date of Patent: May 6, 2014

(54) SYSTEM HEALTH AND PERFORMANCE CARE OF COMPUTING DEVICES

(75) Inventors: Robert Cowie, Escondido, CA (US); Tam Dao, San Marcos, CA (US); Tom Lam, Chula Vista, CA (US); Don Nguyen, San Marcos, CA (US); Guoxuan Zhang, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/203,973

(22) PCT Filed: Nov. 19, 2009

(86) PCT No.: PCT/US2009/006209
§ 371 (c)(1),
(2), (4) Date: Oct. 17, 2011

(87) PCT Pub. No.: WO2011/062575
PCT Pub. Date: May 26, 2011

(65) Prior Publication Data
US 2013/0124926 A1    May 16, 2013

(51) Int. Cl.
*G06F 11/00*    (2006.01)
(52) U.S. Cl.
USPC ................................ 714/25; 714/26
(58) Field of Classification Search
USPC ............. 714/25, 26, 27, 4.1, 4.21, 43, 45, 48
See application file for complete search history.

(56) References Cited

U.S. PATENT DOCUMENTS

| | | | |
|---|---|---|---|
| 6,026,500 A * | 2/2000 | Topff et al. | 714/26 |
| 6,473,659 B1 * | 10/2002 | Shah et al. | 700/79 |
| 6,742,141 B1 * | 5/2004 | Miller | 714/26 |
| 6,785,848 B1 | 8/2004 | Glerum et al. | |
| 2003/0114949 A1 | 6/2003 | Armstrong et al. | |

(Continued)

FOREIGN PATENT DOCUMENTS

| | | |
|---|---|---|
| CN | 101542443 | 9/2009 |
| JP | 2004514208 | 12/2005 |

OTHER PUBLICATIONS

Official Action for Russian Federation Application Serial No. 2011143530 mailed from the Patent Office of the Russian Federation on Dec. 20, 2012, 8 pages including English translation of office action.

(Continued)

*Primary Examiner* — Dieu-Minh Le
(74) *Attorney, Agent, or Firm* — Fitch, Even, Tabin & Flannery LLP

(57) ABSTRACT

A system and computer program product for system care for a computing device. In one embodiment, a process includes analyzing one or more software and hardware components of the computing device by a system care program of the computing device, analyzing system health of the computing device based on the one or more software and hardware components based on at least one of status and settings of the one or more software and hardware components, and analyzing performance of the computing device based on the one or more software and hardware components based on signature profiles of the one or more software and hardware components The process may also include determining one or more solutions for the computing device by the system care program based on the system health and performance of the computing device, and displaying a report including the one or more solutions.

20 Claims, 6 Drawing Sheets

(56) References Cited

U.S. PATENT DOCUMENTS

| | | | |
|---|---|---|---|
| 2004/0090341 | A1 | 5/2004 | Hendrickson |
| 2004/0205034 | A1* | 10/2004 | Bigus et al. ............... 706/10 |
| 2005/0102569 | A1 | 5/2005 | Wu et al. |
| 2005/0166094 | A1 | 7/2005 | Blackwell et al. |
| 2007/0089094 | A1 | 4/2007 | Levine et al. |
| 2008/0172574 | A1 | 7/2008 | Fisher, Jr. |

OTHER PUBLICATIONS

Extended European Search Report for European Patent Application No. 09851521.6 mailed from the European Patent Office on Jun. 24, 2013.

iolo technologies, LLC, "System Mechanic Professional", http://www.iolo.com/system-mechanic/technicaloverview.aspx (website); pp. 1-8; downloaded Mar. 30, 2009.

Uniblue, "SpeedUpMyPC 2009", http://www.liutilities.com/products/speedupmypc/ (website): pp. 1-2; downloaded Mar. 30, 2009.

Business Logic Corporation, "WinCleaner OneClick Professional Clean 11", http://pc-system-utilities-software-review.toptenreviews.com/wincleaner-complete-pc-care-review.html (website); pp. 1-2; downloaded Mar. 30, 2009.

Notification of Reasons for Refusal for Japanese Patent Application No. 2012-530849 issued by the Japan Patent Office on Nov. 13, 2013 (with English translation).

First Office Action for Application No. 200980159429.2 mailed from the State Intellectual Property Office of the People's Republic of China on Dec. 4, 2013.

* cited by examiner

Monthly Report

System info ⟵ 405
Model: _____
Serial No.: _____
Service Tag: _____

✓ = no issues found   ▲ = Action Suggested   ⊕ = Immediate Attention

⟵ 410

System Care Update
✓ •No Action needed.

Firewall
✓ •No Action needed.

Overall Security
▲ •More Information.

Overall Security
▲ •More Information.

SYSTEM HEALTH AND PERFORMANCE CARE OF COMPUTING DEVICES

CROSS-REFERENCE TO RELATED APPLICATIONS

This application is related to by subject matter and claims priority to PCT/US2009/006209 filed Nov. 19, 2009, entitled "System Health and Performance Care of Computing Devices', which is incorporated by reference in its entirety.

FIELD OF THE INVENTION

The present invention relates generally to maintenance of computer devices, and more particularly to systems and methods for optimizing performance by providing one or more solutions to computing devices.

BACKGROUND OF THE INVENTION

Technical support services provided by manufactures of computing devices are a typical solution for assisting customers to troubleshoot and correct a computing device. Many users of computing devices experience operational errors associated with the computing devices. Errors may result from either hardware or software configurations of the computing devices. Many of these users require technical support to aid in correction of these errors. Accordingly, customers typically rely on technical support services provided by the manufacturer of the computing device. Additionally, the quality of technical support provided by a manufacturer may be a basis for the purchase of one or more computing devices. Providing technical support may be very costly for manufacturers. However, it may be necessary to sustain product sales. Thus, there exists a need reduce the number of requests for technical support for computing devices.

Conventional methods of technical support typically require a technical support service agent to interface with the user to correct one or more errors. These services thus require each of the customer support service agent and user to perform one or more steps to correct the issue. In certain instances, the user may not be capable of performing what is required.

Typical scenarios include customer calls directed to problems which may not be resolved by the customer. When the issue requires a patch, service agents can sometimes address the problem by instructing the customer to download configuration files. However, for many customers experiencing the same problem, these customers typically take no action with regards to the defect and/or do not utilize support services. Although solutions to computer issues may be available, these users do not take advantage of the solutions.

For users that decide to live with the problem, system performance may be slowed and in some instances may not function correctly. These performance issues could result in a decrease in sales due to negative customer experience with the computing device.

One conventional approach is to provide corrective files to computing devices to correct software defects which may affect device performance. For example, updates may be transmitted to the computing device by manufacturers of the hardware and/or software. This approach however, may require that users read and apply updates to their devices. Another approach involves pushing files and programs to computing devices. This approach however, may not be desired by many users which prefer reviewing corrective files. Moreover, may users with errors are not aware of the error and/or decide not to take corrective action. Further, these methods do not address specific models of computing devices.

Thus, there is a desire to solutions to computing devices which reduces the number of calls received by service centers and addresses computing devices which may not be maintained by a user.

SUMMARY OF THE EMBODIMENTS

Systems, Disclosed and claimed herein are systems and methods for providing system care for a computing device. In one embodiment, a method includes analyzing, by a system care program of the computing device, one or more software and hardware components of the computing device, analyzing system health of the computing device based on the one or more software and hardware components based on at least one of status and settings of the one or more software and hardware components, and analyzing performance of the computing device based on the one or more software and hardware components based on signature profiles of the one or more software and hardware components. The method further includes determining one or more solutions for the computing device by the system care program based on the system health and performance of the computing device, and displaying a report including the one or more solutions.

Other aspects, features, and techniques of the invention will be apparent to one skilled in the relevant art in view of the following detailed description of the invention.

Disclosed and claimed herein are systems and methods for providing system care for a computing device. In one embodiment, a method includes analyzing, by a system care program of the computing device, one or more software and hardware components of the computing device, analyzing system health of the computing device based on the one or more software and hardware components based on at least one of status and settings of the one or more software and hardware components, and analyzing performance of the computing device based on the one or more software and hardware components based on signature profiles of the one or more software and hardware components. The method further includes determining one or more solutions for the computing device by the system care program based on the system health and performance of the computing device, and displaying a report including the one or more solutions.

Other aspects, features, and techniques of the invention will be apparent to one skilled in the relevant art in view of the following detailed description of the invention.

BRIEF DESCRIPTION OF THE DRAWINGS

FIG. 1 The features, objects, and advantages of the present invention will become more apparent from the detailed description set forth below when taken in conjunction with the drawings in which like reference characters identify correspondingly throughout and wherein:

FIG. 1 depicts a simplified system diagram according to one embodiment of the invention;

FIG. 4 depicts a graphical representation of a monthly report according to one or more embodiments;

DETAILED DESCRIPTION OF EXEMPLARY EMBODIMENTS

Overview and Terminology

Figure 2:
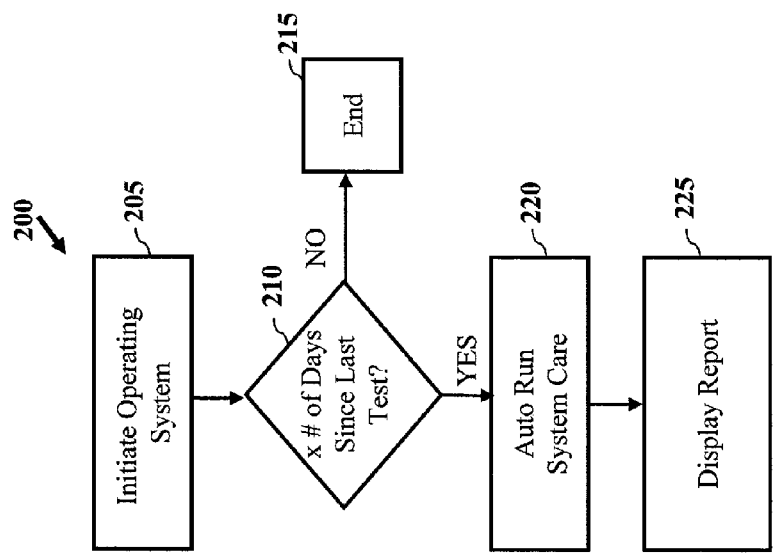
FIG. 2 depicts a process for system care according to one or more embodiments.

One aspect of the present invention relates to a system care program for computing devices. As used herein, system care relates to providing one or more of system maintenance, system diagnostics, one-click care, self-heal, system healthcare and troubleshooting of a computing device. In one embodiment, a system care program is provided for maintaining computing devices by updating, monitoring and/or performing one or more acts to address hardware and software components of the computing system. As such, the system care program may address one or more operational errors of a computing device that a user may or may not be aware of. Alternatively, or in combination, the system care program may optimize performance of the computing device.

In one embodiment, a process for providing system care for a computing device is provided. The process may include analyzing one or more software and hardware components of the computing device by a system care program of the computing device, analyzing system health of the computing device based on the one or more software and hardware components and analyzing performance of the computing device based on the one or more software and hardware components. The process may further include determining one or more solutions for the computing device by the system care program based on the system health and performance, and displaying a report including the one or more solutions.

In another embodiment, the system care program relates to a manufacturer's system care program (e.g., VAIO Care™ by Sony™). In that fashion, system care may be provided to computing devices associated with the manufacturer, such as through an extended warranty plan. Further, one object of the system care program may be to reduce the number of user calls to technical service by addressing one or more errors which may be correctable for the user.

According to another embodiment, a system may be provided for transmission of one or more solutions to a computing device. The system may allow for one or more solution providers, such as a manufacturer technical support, to provide one or more solutions to a system care program associated with a computing device. The system may further include one or more servers to provide the solutions to the computing device via a communication network.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
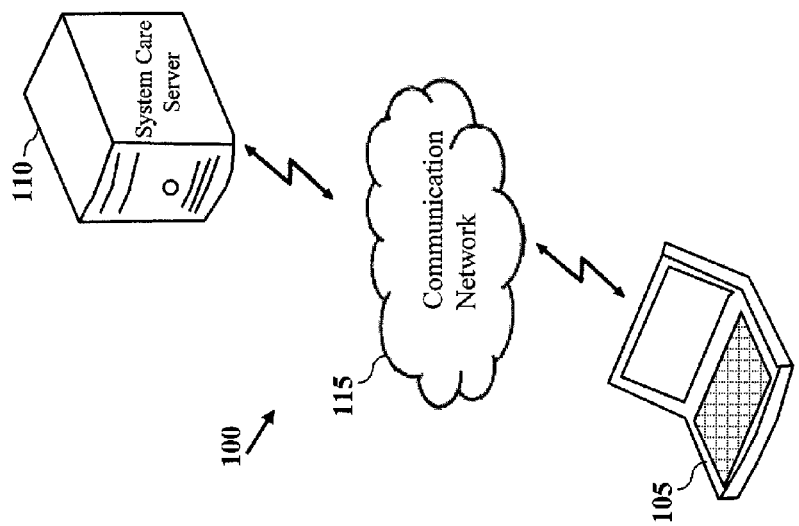

Referring now to the figures, FIG. 1 depicts a simplified system diagram for providing system care for a computing device. In one embodiment, computing device 105 of system 100 includes a processor and memory which may store and execute computer program code for a system care program. Computing device 105 is configured to store and execute a system care program. By way of example, the system care program may be configured to provide system maintenance such that operation of software and hardware components may be optimized. The system care program may be configured to update components, monitor performance and perform system tune-up for computing device 105. The system care program may further be configured to generate system health reports to identify the status of one or more components and guide a user in addressing system issues and operational errors. In one embodiment, the system care program may provide system healthcare to provide user's with a status of antivirus protection software and security issues that may be affecting computer performance. According to another embodiment, the system care program may be configured to diagnose one or more system attributes to identify one or more hardware and software solutions.

According to one embodiment, the system care program may provide a user interface for a user. The system care program can allow for one-click care, system health care, a troubleshooting advisor and service care, each of which may be selected by a user. One-click care provided by the system care program may relate to updating system program files and verification of system components based on user selection of the graphical user interface. For example, the graphical interface can include a one-click care icon, which upon user selection, the system care program of computing device 105 can launch system care program files. The system care program may provide system health functionality by automatically detecting status of components associated with providing system security and components which may be affecting computer performance. The troubleshooting advisor of the system care program may allow for a user of computing device 105 to assess one or more operational aspects of computing device 105 and provide instructions via the user interface to assess one or more issues. Service care functionality may allow for a user to contact and interface with a technical support agent.

According to another embodiment, the system care program of computing device 105 may interoperate with a system care server 110 of system 100 via communication network 115 to address problems of computing device 105. System care server 110 may relate to a technical support server provided by a manufacturer (e.g., VAIO Care™ server). As will be discussed in more detail below, system care server 110 can provide one or more solutions to computing device 105 based on one or more operational errors detected. Communication network 115 may relate to one of a telephone network, packet switched transmission network (PSTN), internet protocol (IP) network, etc. Communication network 115 may further include one or more devices to providing over-the-air signaling including broadcast and media content in general.

Referring now to FIG. 2, a system care process is depicted according to one embodiment. Process 200 may be initiated during startup of a computing device (e.g., computing device 105). In certain embodiments, process 200 may be initiating an operating system of the computing device at block 205. The system care program may determine whether a system care process has been performed by the computing device within a predetermined period of time at block 210. For example, the system care program may be launched once a month. In certain embodiments, the system care program may be launched at least once a day. In one embodiment, when system care program has been performed within the predetermined period ("NO" path out of decision block 210), the system care program can end at block 215. When the system care program has not been performed within the predetermined time ("YES" path out of decision block 210), the system care program may automatically run a system care program at block 220. System care program processes may be performed to determine one or more operational errors and/or to optimize performance of a computing device.

Operational errors may be detected by one of an operating system and a system care program of a computing device. System errors may relate to program failure, program crash, hardware error, reduced system speed, etc. In one embodiment, detection of a system error may be based on one or more signature files of the computing device. For example, signature files generated by an operating system associating one or more processing events of the computing system with an identifier and/or tag may be detected by the system care program. Solutions to the operational error may be based on mapping the error to one or more solutions. In one embodiment, errors may be detected based on a signature file and or event occurrences provided identifiers (e.g., a bucket identifier).

The system care program may correlate one or more of an application number, application version, module name, module version and exception with one or more solutions for the computing device. At block 225, a user interface of the system care may be launched and/or displayed for a user to display a report based on the automatic system care program.

As will be discussed in more detail below with respect to FIG. 3, the system care program may include one or more buttons or icons in a user interface for selection by a user. The user interface can additionally inform a user of one or more errors or system characteristics which require attention.

Based on the user selection, the system care program can initiate a system care process to perform one or more of a one-click solution, system health care, troubleshooting advisor and service care processes.

One advantage of the system care program may be to provide solutions to one or more system errors based on errors faced by other users to optimize performance of the computing device. Accordingly, a system care process may query a system care server (e.g., system care server 110) for one or more solutions. Solutions provided by the system care server may be employed by the system care program to correct system errors. Further, the system care program may provide solutions provided by a manufacturer (e.g., VAIO Care™ Solutions). As such, the system care program can update the computing device based on manufacturer provided updates, patches model specific corrections.

Figure 3:
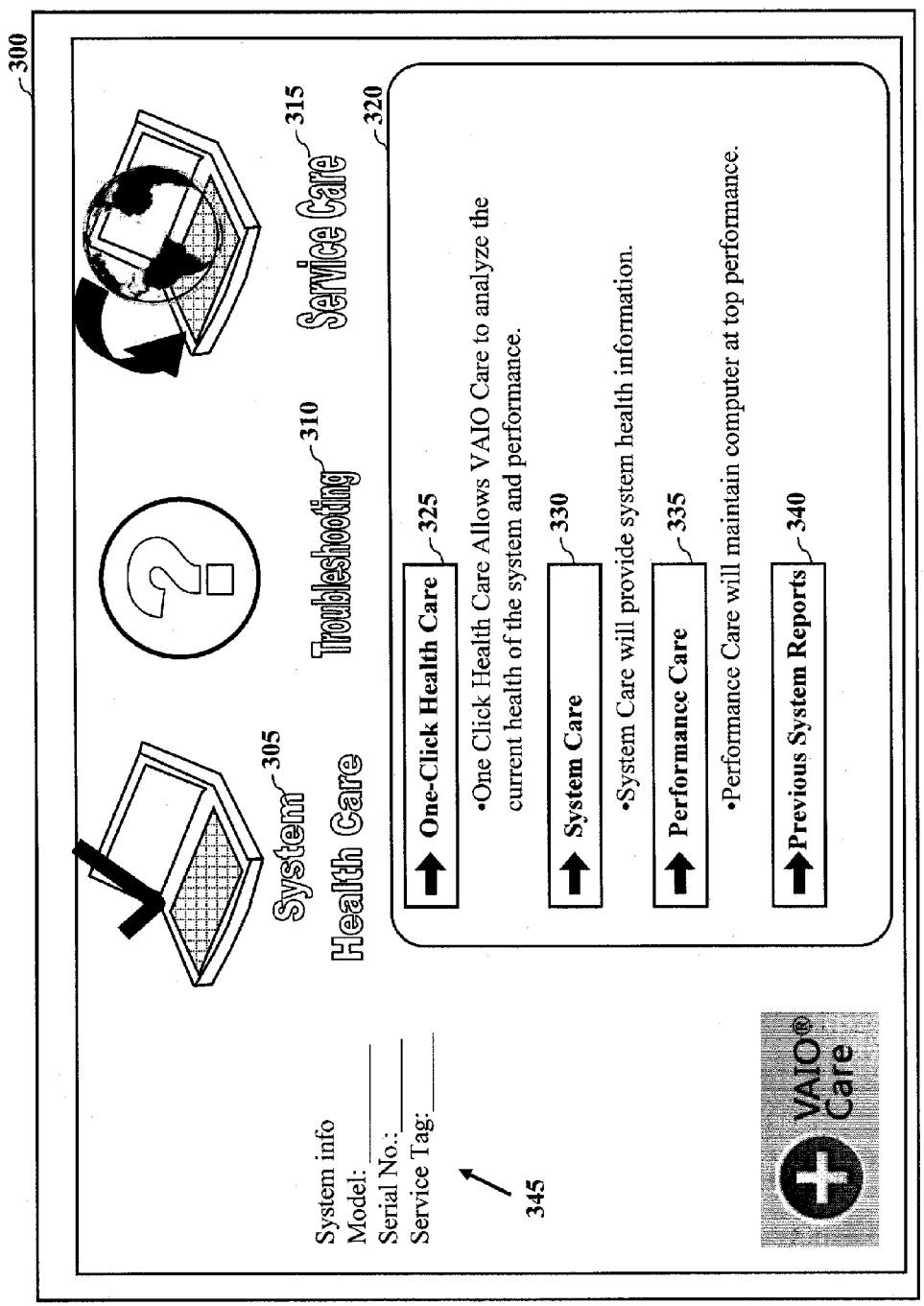
FIG. 3 depicts a graphical representation of a user interface according to one embodiment.

Referring now to FIG. 3, a graphical representation is depicted of an exemplary display window of a user interface provided by the system care program according to one or more embodiments of the invention. Display window 300 of the user interface may include one or more buttons for access to functions of the system care program, such as system health care button 305, troubleshooting button 310, and service care button 315. As shown, selection of system health care button 305 can result in display of selection window 320. Selection window 320 may include a plurality of user selectable buttons associated with functionality of the system care program. One-click health care button 325 may be employed by a user to select one-click functionality of the system care program. Upon selection of the one-click care button 325 the system care program may be configured to analyze the current health and system performance of a computing device. System health care button 330 may be selected to provide system health care information. In a similar fashion, selection of performance care button 335 may be selected to maintain the computing device in top performance. Selection window 320 may further include a previous system reports button 340 which may by employed to access previous reports.

Troubleshooting button 310 may be selected by a user of the computing device (e.g., computing device 105) to assess one or more operational aspects of the computing device and provide instructions via the user interface to assess one or more issues. Troubleshooting button 310 may be selected (e.g., clicked) by a user for the system care program to display a system care advisor to assist a user in diagnosing one or more operational errors of the computing device.

According to another embodiment, the system care program may be configured to interoperate with an operating system of the computing device to determine components of the computing device. For troubleshooting of specific components, a user may select one or more of the buttons of the user interface to receive one or more solutions and/or graphical information via the user interface to correct one or more operational problems. Based on a user selection of troubleshooting button 310, the user interface may display possible solutions associated with one or more operational errors. The possible solutions may each include a button which may be selected by a user to address one or more issues. Based on a user selection, the system care program may perform one or more actions. According to another embodiment, the system care program may display one or more solutions based on user selection of troubleshooting button 310. The user interface of the system care program may thus address operational errors experienced by a user of the computing device.

The system care user interface may further include service care button 315 for access to a technical service provider for assistance. Service care functionality may be associated with a manufacturer's technical service solution (e.g., VAIO™ support services). The user interface of the system care program may further include system information associated with software and hardware components, shown as 345.

According to another embodiment of the invention, the system care program may provide reports of system status. The reports may be provided periodically (e.g., weekly, monthly, etc.). Referring now to FIG. 4, a graphical representation is depicted of system care report 400 according to one or more embodiments of the invention. In one embodiment, the report may be provided monthly to a user of the computing device. The report may include system information, shown as 405, including a model number, serial number, service tag number, etc. The report may additionally include one or more icons to provide a user with an update of the system. Symbols, shown as 410, may be employed in the graphical user interface to provide a user with an indication of components which need attention. Symbols 410 may relate to a check mark indicating that no issues are found, a triangle indicating that action is suggested an exclamation point indicating that immediate attention is required. In one embodiment, triangle 410 may indicate that needs attention, while check mark 415 may indicate that the system components are in compliance. Exemplary messages, shown as 415 in FIG. 4, may be based on particular categories, such as the operating system and system care updates. Messages 415 may further indicate that one or more patches are available.

Figure 5:
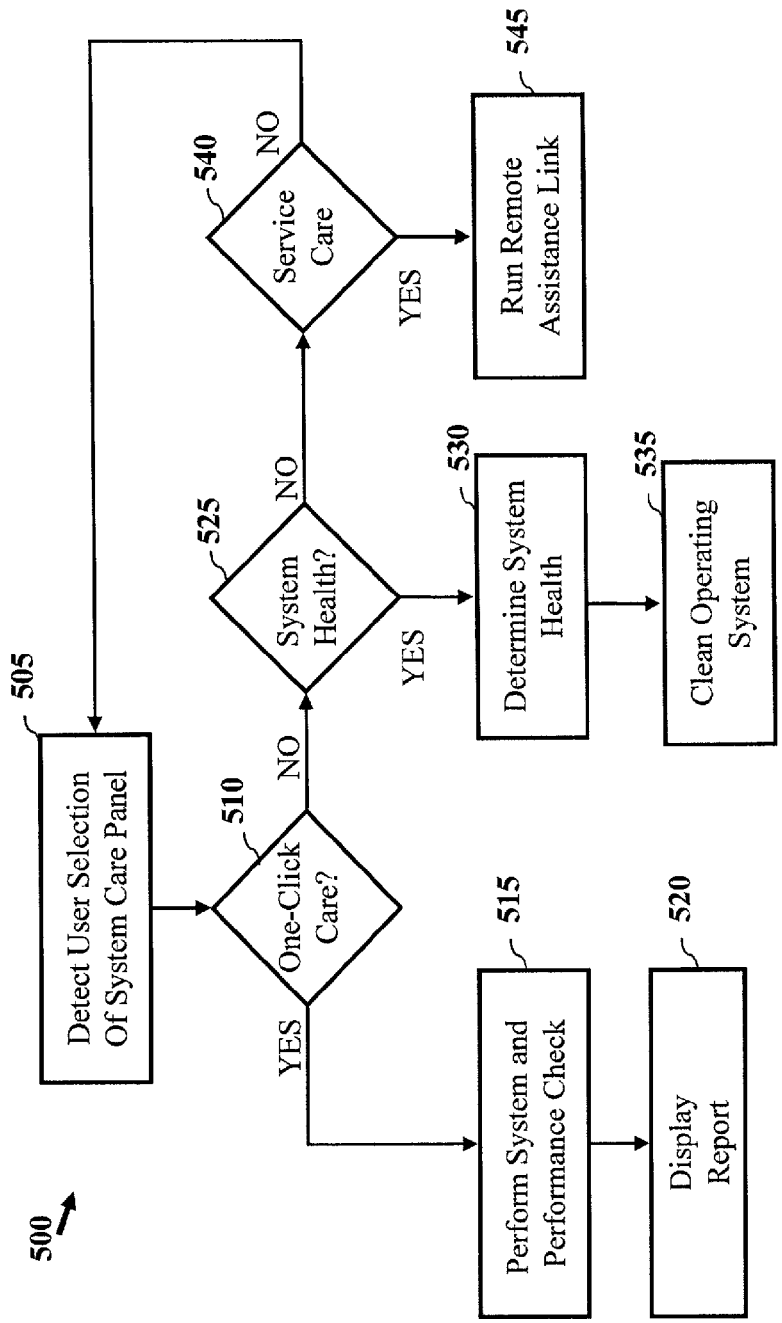
FIG. 5 depicts a self-heal process according to one or more embodiments.

According to one embodiment, the system care program can optimize performance and correct one or more issues faced by the computing device to provide system care functionality. Referring now to FIG. 5, a process for system care is depicted according to one or more embodiments. In one embodiment, process 500 may be automatically performed during initiation of an operating system of the computing device. Thus, operational errors of a computing device and optimization parameters may be addressed. Process 500 may be initiated by detecting a user selection of a user interface of the system care program at block 505. At decision block 510, the system care program can check for user selection of one-click care. When one-click care is selected ("YES" path out of decision block 510), the system care program performs a system and performance check at block 515. Process 500 may then proceed to display a report at block 520. When one-click care is not selected ("NO" path out of decision block 510), the system care program may be check for user selection of a system health button at decision block 525. One-click care may be particularly advantageous for users that are not aware of one or more operational errors affecting system performance.

Upon selection of the system health button ("YES" path out of decision block 525), the system care program can determine system health at block 530. The system healthcare functionality can check security status of the computing system, such as antivirus software, antispyware status, backup status, drive status, etc. System health care may be based on analyzing one or more of anti-virus status, anti-spyware status, firewall status, internet security status, user account settings, operating system update settings, operating system restore point, operating system backup, system care updates, a device manager, hard-drive disk (HDD) smart data, network connectivity, battery check, upload system report, etc. At block 535, the system care program may clean one or more components of the computing device. For example, the system care program may defragment a hard drive, clean temporary files, and/or clean the operating system. When the system health button has not been selected ("NO" path out of decision block 525), the system care program can check for user selection of service care at block 540. When the user selects service care ("YES" path out of decision block 540), the system care program can establish a remote assistance link for technical service at block 545. When the service care button has not been selected ("NO" path out of decision block 540), the system care program can continue to detect a user selection at block 505.

Figure 6:
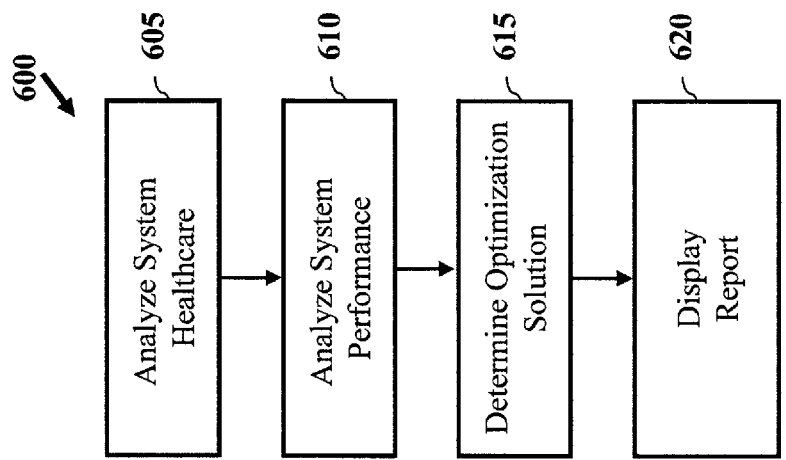
FIG. 6 depicts a process for addressing one or more operational errors according to one or more embodiments.

Referring now to FIG. 6, a process for system care to optimize a computing device is depicted according to one embodiment. Process 600 may be initiated by analyzing one or more software and hardware components of the computing device by a system care program of the computing device at block 605. In one embodiment, the system care program may run a script to diagnose any issues associated with the device. The script may analyze one or more log files to determine the issue presented. Based on one or more self-heal files provided to the system care program, one or more solutions may be provided by the system care program, such as patch files, to optimize performance of the computing device.

Process 600 may continue by analyzing system health of the computing device based on the one or more software and hardware components at block 610 and analyzing performance of the computing device based on the one or more software and hardware components at block 615. According to one embodiment, analysis of computing device components by the system care program may be based on detection of user selection of a one-click button of the user interface. The system care program can determine one or more solutions for the computing device based on the system health and performance at block 615. Solutions for the computing device may be based on manufacturer provided solutions for a detected issue (e.g., VAIO Care™ solutions). According to another embodiment the website may provide one or more downloadable files for correction of the issue. Process 600 may then display a report including the one or more solutions at block 620.

According to another embodiment, system care program may be sustained by providing one or more updates and/or patches to the system care program. For example, the system care server may be updated by a sustaining database/server to provide possible solutions maintained by sustaining engineers. In one embodiment, solutions may be mapped to one or more user computing device issues based operational errors detected. In that fashion, system maintenance may be kept current based on the one or more solutions available. By providing network accessible solutions, the system care program allows for current solutions to be accessed without slowing down system performance by pushing solutions when not needed.

Figure 7:
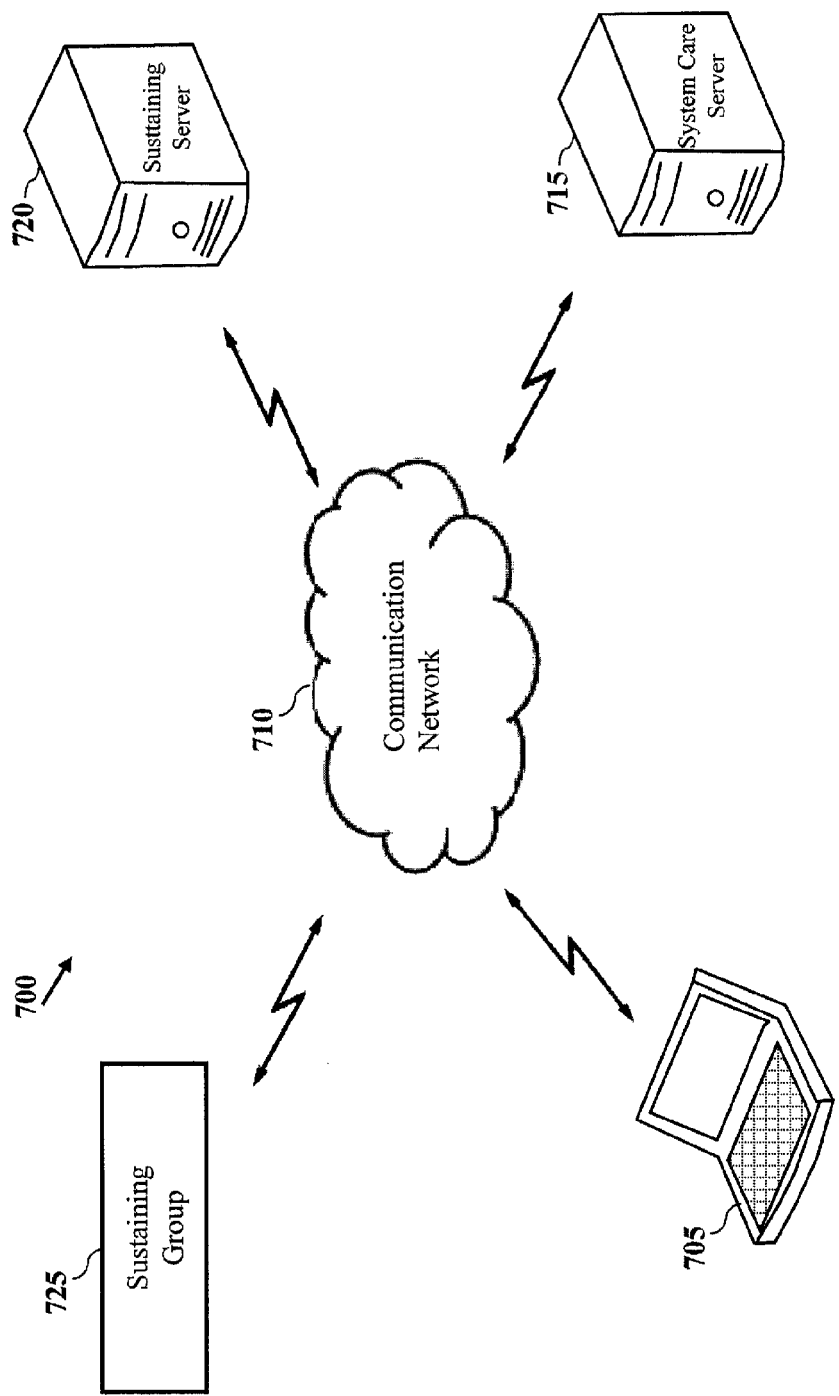
FIG. 7 depicts simplified system diagram for updating system care information according to one or more embodiments.

Referring now to FIG. 7, a simplified block diagram is depicted of a system for updating system care program information according to one or more embodiments. As described herein, the system care program may allow for computing device 705 of system 700 to access one or more solutions from system care server 715 via communication network 710. The system care program may be automatically configured to download a patch based on auto-configuration files and auto-installation features of the system care program from system care server 715 in certain embodiments.

According to another embodiment, sustaining server 720 may provide updates to system care server 715. Sustaining group 725 may maintain and provide updates and solutions sustaining server 720. The sustaining group may relate to one or more technical support agents determining updates and patches to correct one or more operational errors of computing devices. Updates provided by a sustaining group 725 may be mapped to one or more patches and/or identified errors.

Thus, updates may then be provided to sustaining server 720. Update patches and issues that other systems may be facing may be addressed by the sustaining group and provided to users, such as computing device 705.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for providing system care for a computing device, the method comprising the acts of:
   analyzing, by a system care program of the computing device, one or more software and hardware components of the computing device;
   analyzing system health of the computing device based on the one or more software and hardware components based on at least one of status and settings of the one or more software and hardware components;
   analyzing performance of the computing device based on the one or more software and hardware components based on signature profiles of the one or more software and hardware components;
   determining one or more solutions for the computing device by the system care program based on the system health and performance of the computing device; and
   displaying a report including the one or more solutions;
   wherein the system care program initiates the analyzing of system health in response to a user selection of a system health button on a user interface of the system care program; and
   wherein the selection of the system health button further initiates at least one of hard desk defragmentation and cleaning of temporary files.

2. The method of claim 1, wherein analyzing system health and performance of the computing device is based on user selection of one of a one-click button and the system health button.

3. The method of claim 1, wherein the signature profiles relate to one or more of registry signatures, file signatures, event log identifiers and operating system event identifiers.

4. The method of claim 1, wherein the one or more solutions relate to one or more patch files provided to the system care program by a sustaining server.

5. The method of claim 1, wherein the system care program is associated with the manufacturer of the computing device, the system care program interoperating with an operating system of the computing device.

6. The method of claim 1, wherein the report relates to a periodic report and indicates the status of one or more components of the computing device.

7. The method of claim 1, further comprising performing one or more of a system update and system verification based on the one or more solutions.

8. The method of claim 1, further comprising cleaning the computing device based on user selection of the system health button of the user interface of the system care program.

9. The method of claim 1, further comprising connecting to a remote assistance center based on user selection of service care button of a user interface of the system care program.

10. A computer program product comprising:
    a non-transitory computer storage medium having computer executable program code embodied therein to provide a system care program for a computing device, the computer storage medium having:
    computer executable program code to analyze one or more software and hardware components of the computing device;
    computer executable program code to analyze system health of the computing device based on the one or more software and hardware components based on at least one of status and settings of the one or more software and hardware components;
    computer executable program code to analyze performance of the computing device based on the one or more software and hardware components based on signature profiles of the one or more software and hardware components;
    computer executable program code to determine one or more solutions for the computing device by the system care program based on the system health and performance of the computing device; and
    computer executable program code to display a report including the one or more solutions;
    wherein computer executable program code to analyze system health is executed in response to a user selection of a system health button on a user interface of the system care program; and
    wherein the selection of the system health button further executes computer executable program code for performing at least one of hard desk defragmentation and cleaning of temporary files.

11. The computer program product of claim 10, wherein analyzing system health and performance of the computing device is based on user selection of one of a one-click button and the system health button.

12. The computer program product of claim 10, wherein the signature profiles relate to one or more of registry signatures, file signatures, event log identifiers and operating system event identifiers.

13. The computer program product of claim 10, wherein the one or more solutions relate to one or more patch files provided to the system care program by a sustaining server.

14. The computer program product of claim 10, wherein the system care program is associated with the manufacturer of the computing device, the system care program interoperating with an operating system of the computing device.

15. The computer program product of claim 10, wherein the report relates to a periodic report and indicates the status of one or more components of the computing device.

16. The computer program product of claim 10, further comprising computer executable code to perform one or more of a system update and system verification based on the one or more solutions.

17. The computer program product of claim 10, further comprising computer executable code to clean the computing device based on user selection of the system health button of the user interface of the system care program.

18. The computer program product of claim 10, further comprising computer executable code to connect to a remote assistance center based on user selection of service care button of a user interface of the system care program.

19. A system comprising:
    a server; and
    a computing device configured for providing system care, the computing device configured to:
    analyze, by a system care program of the computing device, one or more software and hardware components of the computing device;
    analyze system health of the computing device based on the one or more software and hardware components based on at least one of status and settings of the one or more software and hardware components;

analyze performance of the computing device based on the one or more software and hardware components based on signature profiles of the one or more software and hardware components;

determine one or more solutions for the computing device by the system care program based on the system health and performance of the computing device; and display a report including the one or more solutions wherein the system care program initiates the analyzing of system health in response to a user selection of a system health button on a user interface of the system care program; and wherein the selection of the system health button further initiates at least one of hard desk defragmentation and cleaning of temporary files.

20. The system of claim 19, wherein server is associated with a manufacturer system care server for the computing device.

\* \* \* \* \*

UNITED STATES PATENT AND TRADEMARK OFFICE
CERTIFICATE OF CORRECTION

PATENT NO. : 8,719,634 B2  
APPLICATION NO. : 13/203973  
DATED : May 6, 2014  
INVENTOR(S) : Cowie et al.

Page 1 of 1

It is certified that error appears in the above-identified patent and that said Letters Patent is hereby corrected as shown below:

On the TITLE PAGE:
  Column 2, ABSTRACT, line 11-12, delete "components" and insert --components.--.

In the CLAIMS:
  Claim 1, column 9, line 35, delete "hard desk" and insert --hard disk--.
  Claim 10, column 10, line 27, delete "hard desk" and insert --hard disk--.
  Claim 19, column 11, line 17, delete "hard desk" and insert --hard disk--.

Signed and Sealed this
Twenty-first Day of October, 2014

Michelle K. Lee
*Deputy Director of the United States Patent and Trademark Office*